Nov. 24, 1964  R. E. WARD  3,158,354
LIFTING DEVICE
Filed Sept. 7, 1962  2 Sheets-Sheet 1
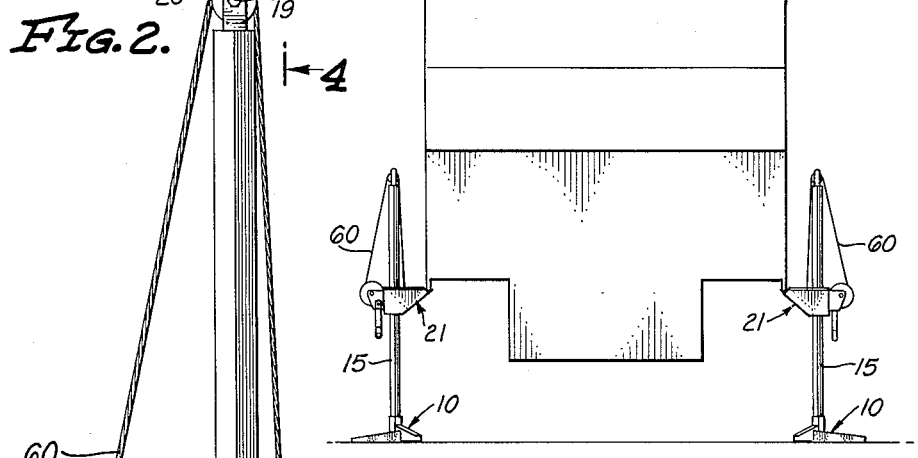
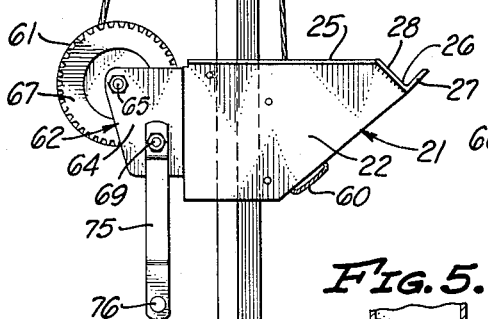
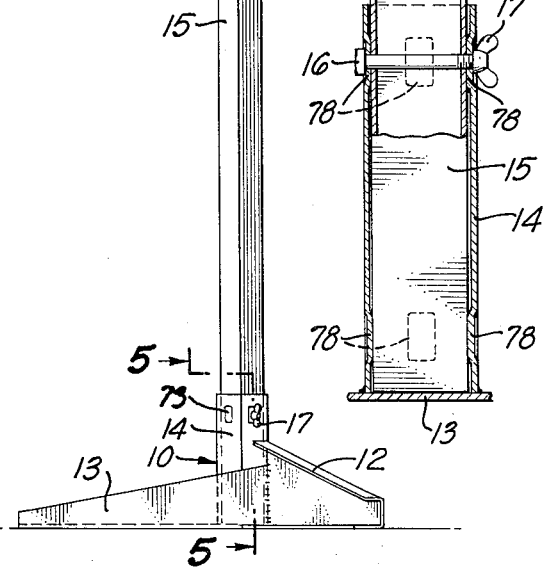
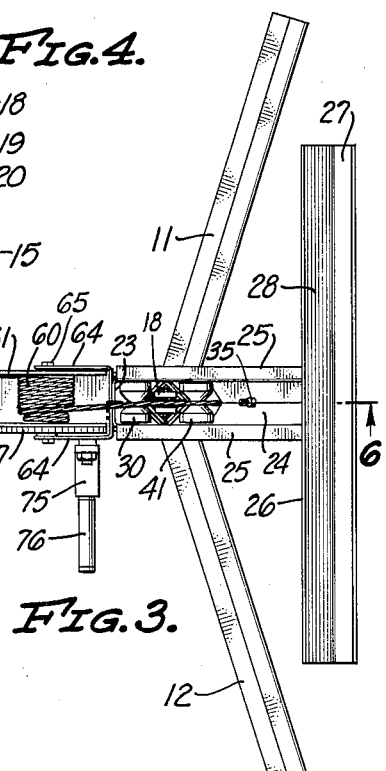
INVENTOR.
RALPH E. WARD
BY Robert C. Comstock
ATTORNEY Nov. 24, 1964  R. E. WARD  3,158,354
LIFTING DEVICE
Filed Sept. 7, 1962  2 Sheets-Sheet 2
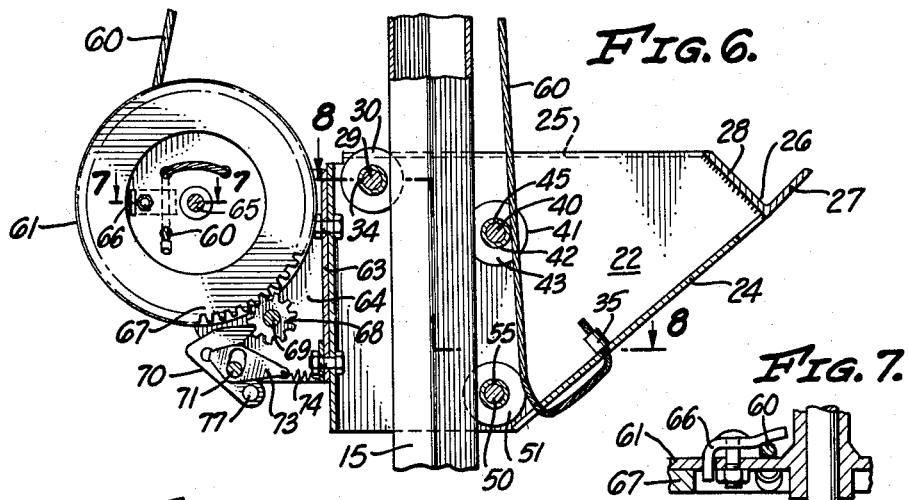
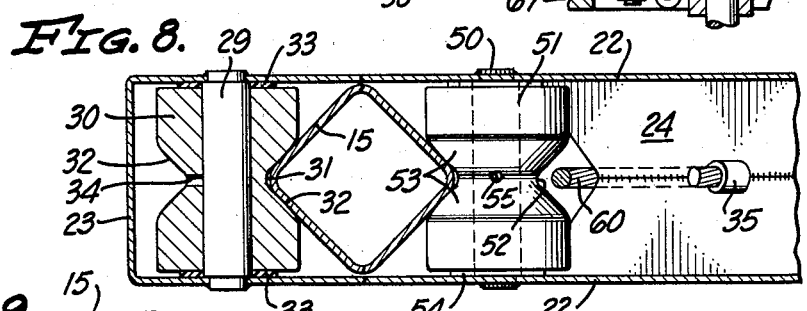
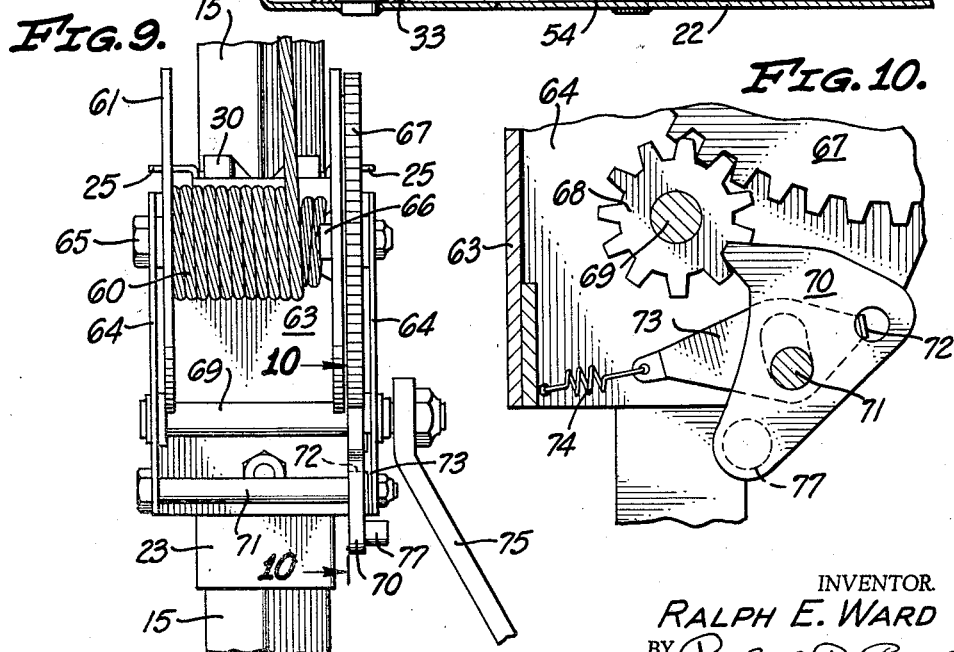
INVENTOR.
RALPH E. WARD
BY Robert C. Comstock
ATTORNEY 3,158,354
LIFTING DEVICE
Ralph E. Ward, Rialto, Calif., assignor to Precision Welding of Rialto, Rialto, Calif., a partnership
Filed Sept. 7, 1962, Ser. No. 221,978
5 Claims. (Cl. 254—47)

This invention relates to a lifting device, which may be in the form a jack or a hoist.

It is an object of the invention to provide a lifting device which is capable of performing substantially any type of heavy lifting or hoisting and which is particularly adapted for use in lifting campers which are removably mounted on the beds of automotive vehicles, commonly pick-up trucks.

Such campers, which have become increasingly popular in recent years, customarily comprise a self-contained body unit within which are disposed beds, cooking equipment and other articles of furniture to provide temporary eating, sleeping and living accommodations.

The present invention is adapted to permit the owner of such a camper to easily mount the camper on the truck bed or remove it therefrom. It is even possible for one person to do so alone.

The advantages of such simplified mounting and removal of the camper are manifold. It eliminates the necessity of hauling the camper around when it is not in use, which wastes gasoline and renders the vehicle more difficult to drive. It extends the life of the camper many times, since the camper is exposed to weather and wear only when it is in actual use. It permits quick separation of the camper and truck while camping, so that one person can use the camper while another uses the truck. It also permits the camper to be parked to reserve and hold a selected campsite while the owner is away from the site with the truck.

It is accordingly among the objects of the invention to provide a lifting device for this purpose or for other lifting purposes which is extremely simple to use and is strong, rugged and both fool proof and fall-proof in operation.

Among the further more detailed advantages of the invention are to provide such a device which is capable of being easily disassembled and stored in a relatively small space and then easily reassembled for use, without requiring any tools; to provide such a device which gives substantially the maximum amount of lifting range in both vertical directions and to provide such a device which will not endanger the camper or other object being lifted and which will not endanger the person operating it.

The invention also comprises such other objects, advantages and capabilities as will later more fully appear and which are inherently possessed by the invention.

While there is shown in the accompanying drawings an embodiment of the invention which comprises a portable jack for mounting on the ground to lift campers, it should be understood that the same structure and principles of operation involved in the lifting mechanism may be employed in substantially any type of portable or stationary hoist or lifting device.

It should also be understood that the embodiment of the invention shown and described herein is susceptible of other modification and change without departing from the spirit of the invention.

Referring to the drawings, FIG. 1 is a front elevational view of two lifting devices in use supporting a camper;

FIG. 2 is a side elevational view of the camper jack which has been selected to illustrate the invention;

FIG. 3 is a top plan view of the same;

FIG. 4 is an enlarged partially fragmentary view of the upper end of the jack taken along lines 4—4 of FIG. 2;

FIG. 5. is an enlarged sectional view of the base taken along lines 5—5 of FIG. 2;

FIG. 6 is an enlarged sectional view of the lifting assembly taken along lines 6—6 of FIG. 3;

FIG. 7 is an enlarged sectional view taken along lines 7—7 of FIG. 6, showing the attachment of the end of the cable to the reel;

FIG. 8 is an enlarged sectional view taken along lines 8—8 of FIG. 6, showing the relationship between the top and bottom rollers and the post;

FIG. 9 is a fragmentary enlarged rear elevational view of the reel assembly;

FIG. 10 is an enlarged fragmentary sectional view of the ratchet and pawl, taken along line 10—10 of FIG. 9.

The embodiment which has been selected to illustrate my invention comprises a portable jack having a base 10. The base 10 includes a pair of front legs 11 and 12, which extend at an obtuse angle with respect to each other and a shorter rear leg 13. Extending vertically upwardly from the intersection of the legs 11, 12 and 13 is an open top tube 14 having a substantially square cross section and a closed bottom. The tube 14 is disposed so that one of its diagonals extends along a line bisecting the angle of intersection of the front legs 11 and 12. The rear leg 13 extends along the same line.

An elongated vertically directed post 15 has its lower end removably mounted within the tube 14. The sides of the tube 14 are provided with a plurality of indentations 78, which take up any play between the post 15 and the tube 14. A bolt 16 extends through aligned openings in the sides of the tube 14 and post 15 to hold the bottom of the post 15 within the tube 14. A wing nut 17 is screw threadedly mounted on the end of the bolt 16 for easy manual removal or attachment when assembling or disassembling the jack.

The post 15 is hollow and has a substantially square cross section, with somewhat rounded corners. It is aligned with the tube 14, so that one of its diagonals is directed toward what may be termed the front of the jack. Extending vertically upwardly from the top of the post 15 is a yoke 18. A rod 19 extends across the midportion of the yoke 18. A pulley 20 is rotatably mounted on the rod 19. The top of the yoke 18 extends a substantial distance above the top of the pulley 20. The yoke 18 has an open top, to permit a cable to be mounted on or removed from the pulley 20. The pulley 20 extends diagonally with respect to the post 15.

Mounted for vertical movement along the post 15 is a movable lifting frame 21. The frame 21 has a substantially trapezoidal body portion which includes a pair of parallel side plates 22, a vertical back plate 23 and an angularly directed front plate 24. The side plates 22 have short front edges which extend rearwardly at an angle from the upper end of the front plate 24 to the top of the frame 21. The frame 21 has an open top and an open bottom, with the post 15 extending vertically therethrough. The upper ends of the side plates 22 are bent outwardly at a right angle to form a pair of flanges 25.

An elongated lifting bar 26 is fixedly mounted on the front of the frame 21. The lifting bar 26 has a short side 27 and a long side 28, which are disposed at a 90° angle to each other. The long side 28 of the lifting bar 26 is attached to the front edge of the side plates 22 between the upper end of the front plate 24 and the top of the frame 21. The long side 28 is also attached to the flanges 25.

The lifting bar 26 is disposed at substantially a 45° angle with respect to the ground, with its open side directed upwardly. A straight vertical line would accordingly bisect the angle formed by the sides 27 and 28 of the lifting bar 26.

A stationary top pin 29 extends between and is secured to the side plates 22 of the frame 21, adjacent to the upper rear corner of the frame 21. A top roller 30 is rotatably mounted on the pin 29. The roller 30 has what may be termed an hourglass shape, with a pair of straight portions 31 adjacent its ends and a pair of inwardly directed angular walls 32 intersecting adjacent its center. The angular walls 32 are substantially straight and extend at substantially a 90° angle with respect to each other. The angular walls 32 are adapted to engage the sides of the post 15 adjacent to its rear corner. The rounded rear corner of the post 15 fits within the inwardly directed portion of the roller 30, but the corner of the post 15 is spaced from and does not engage the roller 30.

The top pin 29 extends without diametric reduction beyond each end of the roller 30 a distance substantially equal to the thickness of a plastic thrust washer 33, one of which is mounted on each end of the top pin 29. The washers 33 fit between the ends of the roller 30 and the side plates 22 of the frame 21. The ends of the top pin 29 beyond the washers 33 are diametrically reduced to fit within and extend through openings in the side plates 22 of the frame 21. The ends of the pin 29 are preferably welded to the outside of the side plates 22 so that they remain fixed while the roller 30 rotates.

An opening 34 extends through the center of the roller 30 for providing internal lubrication between the roller 30 and the pin 29. The construction of the pin 29, roller 30 and washers 33 assures uniform tolerances and spacing of parts.

A stationary center pin 40 extends through similar openings in the side plates 22 of the frame 21 and is preferably welded thereto on the opposite side of the post 15 from the top pin 29 and somewhat therebeneath. A center roller 41 which is formed identically with the top roller 30 is rotatably mounted on the pin 29. The center roller 41 has identical straight portions 42 and angular walls 43, which are adapted to engage the sides of the post 15 adjacent to its front corner. The center roller 41 has plastic thrust washers 44 at its opposite ends which are mounted in the same manner as the washers 33. It also has a similar lubrication opening 45.

While the top roller 30 performs a lifting function, the center roller 41 does not. It acts merely as a stop to prevent rotation of the frame 21 with respect to the post 15, while permitting a limited amount of play or side movement of the frame 21 with respect to the post 15. It is accordingly possible to use devices other than the center roller 41 to accomplish the same purpose.

A stationary bottom pin 50 extends through similar openings in the side plates 22 on the same side of the post 15 as the center pin 40, but a considerable distance therebelow adjacent to the bottom of the frame 21. A bottom roller 51, which is formed identically with the top roller 30, is rotatably mounted on the bottom pin 50. The bottom roller 51 has identical straight portions 52 and angular walls 53. The angular walls 53 are adapted to engage the sides of the post 15 adjacent to its front corner. The bottom roller 51 is provided with washers 54 and a lubrication opening 55.

When the lifting device is in use, the downward force which is exerted on the lifting bar 26 by the load being lifted causes the frame 21 to be tilted forwardly and downwardly to bring the top and bottom rollers 30 and 51 into engagement with the post 15 and move the center roller 41 away from the post 15.

A cable 60 has one end thereof extending through the open bottom of the frame 21, then a short distance along the outside of the front plate 24 and through an opening therein. A tubular locking member 35 fits tightly over the end of the cable 60 within the frame 21 and bears against the inside of the front plate 24 to hold the end of the cable 60. The diameter of the locking member 35 is larger than the diameter of the opening through which the cable 60 extends.

The cable 60 extends upwardly within the frame 21, extending through the indented V-shaped portion of the center roller 41 in order to bring the cable 60 as close as possible to the post 15. This provides more directly vertical movement of the cable 60 and permits the device to be disposed more closely to the load being lifted.

The cable 60 extends upwardly from the top of the frame 21 along the front of the post 15, then between the upper ends of the yoke 18 over the pulley 20 and back down along the back of the post 15 to a reel 61. The reel 61 is part of a winch assembly which is secured to the back of the frame 21. The winch assembly includes a U-shaped mounting bracket 62 having a back wall 63 and a pair of parallel side walls 64. The back wall 63 fits flatly against and is secured to the back plate 23 of the frame 21. The side walls 64 extend rearwardly from the back wall 63, substantially parallel to the side plates 22 of the frame 21.

The reel 61 is rotatably mounted on a bolt 65, which extends between the side walls 64 of the bracket 62, adjacent the top thereof. The end of the cable 60 extends outwardly through an opening in the side of the reel 61, then a short distance along the outside of the reel 61 and then back through another opening in the same side of the reel 61. The end of the cable 60 then extends under a lock bar 66, one end of which is bolted to the side of the reel 61 and the other end of which overlies and is clamped against the end of the cable 60, holding it against the side of the reel 61.

A circular gear 67 is secured to the outside of one side of the reel 61, adjacent to and extending around its periphery. The gear 67 engages a circular ratchet 68 of smaller diameter which is carried by a shaft 69, which is rotatably mounted between the side walls 64 of the bracket 62.

The ratchet 68 is engaged by a pawl 70 which is rotatably mounted on a pin 71 which extends across the bottom of the bracket 62. The pawl 70 is provided with an opening within which is disposed a flange 72 on the end of an arm 73. The other end of the arm 73 is attached to one end of a coil spring 74, the other end of which is attached to the side wall 64 of the bracket 62.

A crank lever arm 75 having a handle 76 is attached to one end of the shaft 69. As the lever arm 75 is rotated through use of the handle 76, the shaft 69 is rotated, rotating the ratchet 68. The ratchet 68 acts as a drive gear, with its teeth engaging and driving the teeth of the circular gear 67 to rotate the reel 61. As the ratchet 68 rotates, the pawl 70 is pivoted upwardly against the urging of the coil spring 74. The coil spring 74 normally urges the pawl 70 inwardly to lock the ratchet 68 against reverse rotation and thus lock the reel 61 against reverse rotation.

Reverse rotation of the ratchet 68 and reel 61 can be accomplished only by manually pivoting the pawl 70 out of engagement with the ratchet 68. A circular pin 77 is mounted on the bottom of the pawl 70 so that it extends horizontally and engages the bottom of the adjacent side wall 64 of the bracket 62 to limit the pivotal movement of the pawl 70. This acts as a safety feature, since the pawl 70 must be manually held in non-operating position to permit reverse rotation of the reel 61 and such reverse rotation is automatically stopped whenever the pawl 70 is manually released.

It may be noted that the lifting device comprises three parts which are capable of being easily and quickly assembled and disassembled without the use of any tools whatsoever. When the device is to be disassembled, the cable 60 can be lifted off the top of the pulley 20, to separate the frame 21, cable 60 and reel assembly as a unit. The post 15 can be lifted out of the tube 14 after the wing nut 17 and bolt 16 are removed. This separates the tube 14 from the base 10.

When the device is in use to remove a camper from a truck, one jack is placed on each side of the camper and the lifting bars 26 are moved upwardly until they are at approximately the height of the bottom of the camper.

Most campers are customarily provided with a 2 x 2 or similar member which extends downwardly along each side of the camper. In such case, the jacks are moved inwardly until the outer edges of the 2 x 2's hit the long sides 28 of the lifting bars 26 and are parallel thereto. The lifting bars 26 are then moved upwardly so that the bottoms of the 2 x 2's fit within the lifting bars 26.

If the camper does not have such a 2 x 2 or other member extending downwardly from its sides, the jacks are moved upwardly and inwardly in the manner described. As the lifting bars are moved further upwardly, the bottom of the camper rests upon the upper edges of the short sides 27 of the lifting bars 26, while the bottom side edges of the camper bear against the long sides 28 of the lifting bars 26.

The jacks can be operated simultaneously by two persons or alternately by one person. The camper is moved upwardly until it is above and free from the truck bed. The truck can then be driven away from beneath the camper. The camper can then be lowered to the ground or upon storage blocks or other suitable storage means.

Mounting the camper on the truck is accomplished in substantially the same manner by moving the camper up, backing the truck beneath it and then lowering the camper into position on the truck.

It may be noted that the diagonal orientation of the post 15 with respect to the load being lifted provides added strength to the jack, since the bending moment of the post is considerably greater along its diagonals.

I claim:

1. A lifting device comprising:
a vertically directed post, said post having a substantially square cross section,
a pulley rotatably mounted adjacent to the upper end of said post,
a frame mounted for vertical movement upwardly and downwardly along said post, said post extending vertically through said frame and being disposed diagonally with respect to said frame so that one corner of said post is directed toward the front of said frame and the diagonally opposite corner of said post is directed toward the rear of said frame,
lifting means carried by said frame for engaging an object to be lifted,
a first roller rotatably mounted on said frame adjacent to the rear corner of said post, said roller having a pair of inwardly directed right angular walls of substantially equal size forming a V adjacent to its center, said wall being disposed so as to engage both sides of said post simultaneously and equally adjacent to the rear corner thereof and to move vertically therealong,
a second roller rotatably mounted on said frame adjacent to the front corner of said post on the opposite side of said post from said first roller, said second roller having a pair of inwardly directed right angular walls of substantially equal size forming a V adjacent to its center, said walls being disposed so as to engage both sides of said post simultaneously and equally adjacent to the front corner thereof and to move vertically therealong,
a cable attached at its lower end to said frame,
a reel rotatably mounted on the rear of said frame, the opposite end of said cable being attached to said reel, and
means for rotating said reel to move said frame and lifting means vertically upwardly and downwardly along said post.

2. A lifting device comprising:
a vertically directed post, said post having a substantially square cross section,
a pulley rotatably mounted adjacent to the upper end of said post,
a frame mounted for vertical movement upwardly and downwardly along said post, said post extending vertically through said frame and being disposed diagonally with respect to said frame so that one corner of said post is directed toward the front of said frame and the diagonally opposite corner of said post is directed toward the rear of said frame,
lifting means carried by the front of said frame for engaging an object to be lifted,
a first roller rotatably mounted on said frame adjacent to the rear corner of said post, said roller having a pair of substantially right angular walls of substantially equal size disposed so as to engage both sides of said post simultaneously and equally adjacent to the rear corner thereof and to move vertically therealong,
a second roller rotatably mounted on said frame adjacent to the front corner of said post on the opposite side of said post from said first roller, said second roller having a pair of substantially right angular walls of substantially equal size disposed so as to engage both sides of said post simultaneously and equally adjacent to the front corner thereof and to move vertically therealong,
a cable attached at its lower end to said frame, said cable extending over said pulley,
a reel rotatably mounted on said frame, the opposite end of said cable being attached to said reel, and
means for rotating said reel to move said frame and lifting means vertically upwardly and downwardly along said post.

3. In a lifting device:
a vertically directed post, said post having a substantially square cross section,
a frame mounted for vertical movement upwardly and downwardly along said post,
lifting means carried by said frame for engaging an object to be lifted,
a first roller rotatably mounted on said frame adjacent to one corner of said post, said roller having a pair of substantially right angular walls of substantially equal size disposed so as to engage both sides of said post simultaneously and equally adjacent to said corner and to move vertically therealong, and
a second roller rotatably mounted on said frame adjacent to the diagonally opposite corner of said post from said first roller, said second roller having a pair of substantially light angular walls of substantially equal size disposed so as to engage both sides of said post simultaneously and equally adjacent to said diagonally opposite corner and to move vertically therealong.

4. A lifting device comprising:
a vertically directed post, said post having a substantially square cross section,
a pulley rotatably mounted adjacent to the upper end of said post,
a frame mounted for vertical movement upwardly and downwardly along said post,
lifting means carried by said frame for engaging an object to be lifted,
a first roller rotatably mounted on said frame adjacent to one corner of said post, said roller having a pair of substantially right angular walls of substantially equal size disposed so as to engage both sides of said post simultaneously and equally adjacent to said corner and to move vertically therealong,
a second roller rotatably mounted on said frame adjacent to the diagonally opposite corner of said post from said first roller, said second roller having a pair of substantially right angular walls of substantially equal size disposed so as to engage both sides of said post simultaneously and equally adjacent to said diagonally opposite corner and to move vertically therealong,
a cable attached at its lower end to said frame, said cable extending over said pulley, a reel, the opposite end of said cable being attached to said reel, and means for rotating said reel to move said frame and lifting means vertically upwardly and downwardly along said post.

5. The structure described in claim 4, and a third roller rotatably mounted on said frame adjacent to and on the diagonally opposite side of said post from said first roller, said third roller having a pair of substantially right angular walls of substantially equal size adapted to engage both sides of said post simultaneously and equally adjacent to said diagonally opposite corner thereof, said second and third rollers being disposed on the same side of said post as said lifting means, said walls of said third roller being in engagement with the sides of said post only when said lifting means is not in engagement with an object to be lifted, said first and third rollers both being spaced slightly away from said post, so that when said lifting means engages an object to be lifted, said frame is tilted slightly with respect to said post to move said walls of said third roller substantially out of engagement with the sides of either post during the upward and downward movement of said frame, but in close proximity thereto to limit the sideward movement of said frame with respect to said post.

References Cited in the file of this patent

UNITED STATES PATENTS

| | | |
|---|---|---|
| 104,141 | Hall | June 14, 1870 |
| 1,553,890 | Bruner | Sept. 25, 1925 |
| 1,705,847 | Adams | Mar. 19, 1926 |
| 2,669,422 | Branick | Feb. 16, 1954 |
| 2,858,946 | Breed | Nov. 4, 1958 |
| 2,859,881 | Coryell | Nov. 11, 1958 |
| 2,888,152 | Sugg | May 26, 1959 |
| 2,973,184 | Trautman et al. | Feb. 28, 1961 |
| 2,998,960 | Smith | Sept. 5, 1961 |
| 3,028,978 | Dickens | Apr. 10, 1962 |